Dec. 7, 1937.   A. J. WESTMORELAND   2,101,769
SWEEPER ATTACHMENT FOR MOTOR VEHICLES
Filed April 30, 1936   2 Sheets-Sheet 1
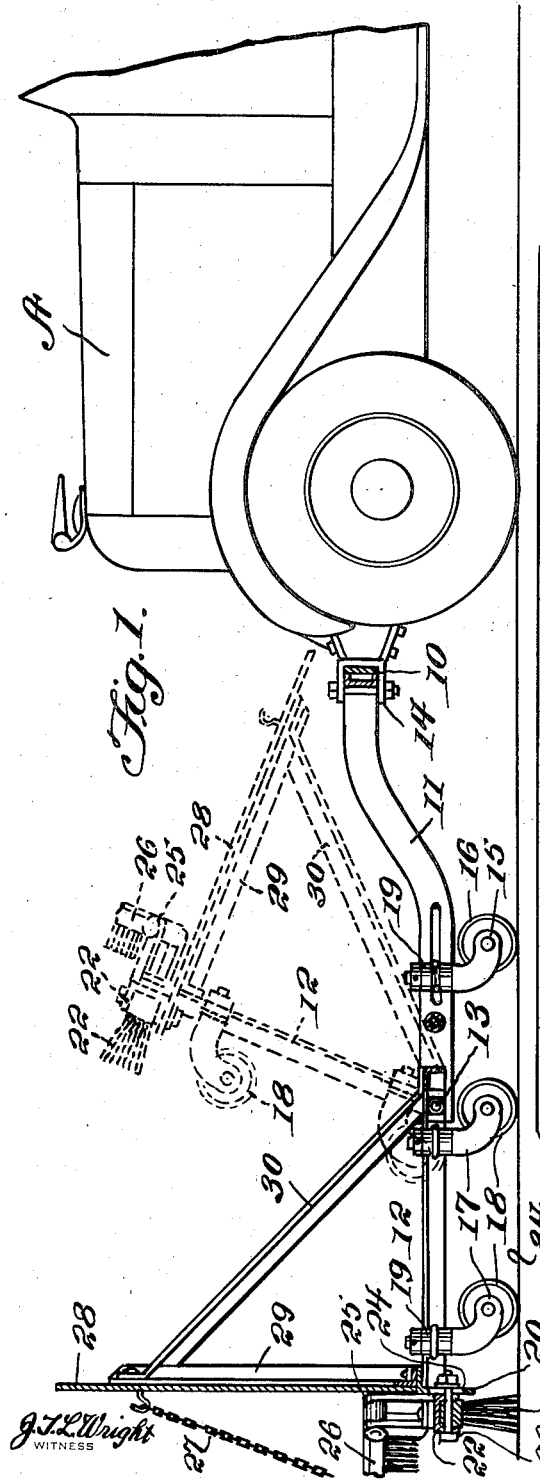
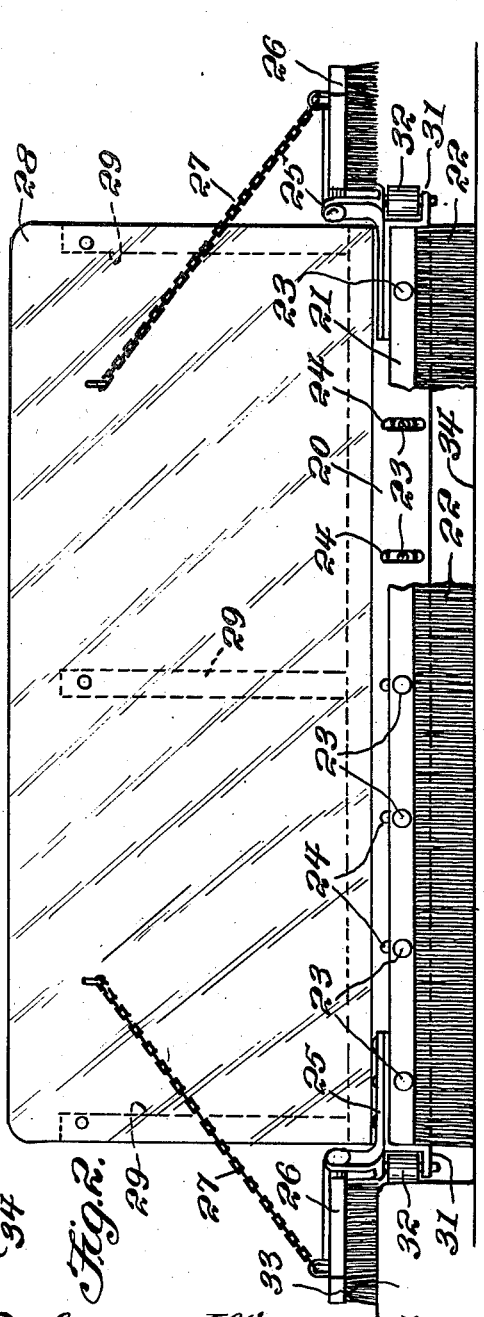
Andrew J. Westmoreland
INVENTOR
BY Victor J. Evans & Co.
ATTORNEYS

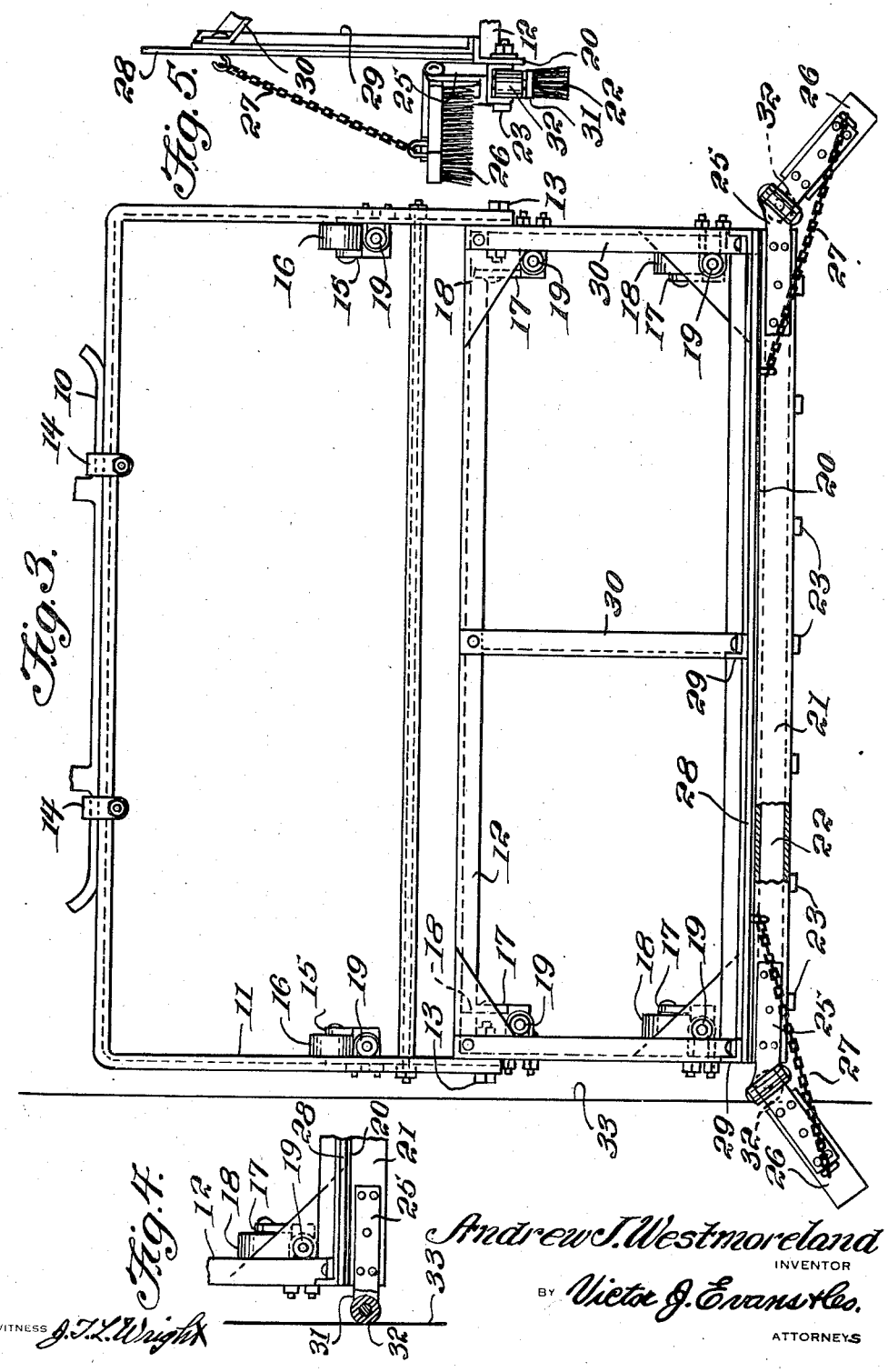

Patented Dec. 7, 1937

2,101,769

UNITED STATES PATENT OFFICE 2,101,769

SWEEPER ATTACHMENT FOR MOTOR VEHICLES

Andrew Jackson Westmoreland, Florence, Ala.

Application April 30, 1936, Serial No. 77,263

3 Claims. (Cl. 15—78)

The invention relates to a street sweeper and more especially to a sweeper attachment for motor vehicles.

The primary object of the invention is the provision of an attachment of this character, wherein the same can be clamped to the front bumper of a motor vehicle and brought into working position for the sweeping of surfaces, such as streets and also the curb, on the advancement of such vehicle, the attachment being of novel construction and is readily and conveniently attached to the vehicle.

Another object of the invention is the provision of an attachment of this character, wherein the same involves a carriage composed of a folding section and such carriage can be clipped to the front bumper of a motor vehicle and when not in working position the swinging section can be raised to an inoperative position without interfering with the travel of the vehicle either forwardly or backwardly and on the swinging of the section to a working position brushes will be disposed for the sweeping of a street surface and also a curb at either side thereof.

A further object of the invention is the provision of an attachment of this character which is simple in its construction, thoroughly reliable and efficacious in its operation, readily and easily applied to and removed from a motor vehicle and when so applied can be moved to inoperative or operative position, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation partly in vertical section of the sweeper attachment constructed in accordance with the invention and shown attached to a motor vehicle, the sweeper being shown in full lines in working position and in dotted lines in inoperative position.

Figure 2 is a front elevation thereof partly in section.

Figure 3 is a top plan view.

Figure 4 is a fragmentary detail sectional view showing the curb roller of the attachment.

Figure 5 is a fragmentary end elevation showing the position of a curb sweeper and the street sweeper elements of the attachment.

Similar reference characters indicate corresponding parts throughout the several views in the drawings.

Referring to the drawings in detail, A designates generally a portion of a motor vehicle of any approved type although it may be a motor truck or a commercial or pleasure vehicle and the same is equipped at its front with a standard bumper 10 or its equivalent to which is adapted to be applied the sweeper attachment constituting the present invention and hereinafter fully described.

The sweeper attachment comprises a main carrier frame 11 and a supplemental carrier frame 12, respectively, these being arranged next to each other and parallel, the frame 12 being pivoted at 13 to the frame 11 so that said frame 12 can be raised and lowered by vertical swinging movement. The frame 11 through the medium of clips 14 is separably attached to the bumper 10 as is clearly shown in Figures 1 and 3 of the drawings.

The frame 11 has swiveled thereto at opposite ends and forwardly of the same by forks 15 caster wheels 16 while the frame 12 at the forked corners thereof has swiveled thereto by forks 17 caster wheels 18. The forks 15 and 17 are suitably pivoted in bearings 19 for the swivel mounting of the said caster wheels.

At the outside longer edge of the frame 12 is a hanger bar 20, it being fixed to the said frame 12 in any suitable manner and carried by this bar for vertical adjustment is the head stock 21 of a street sweeper 22. The head 21 through bolts 23 engaging elongated slots 24 is vertically adjustable on the bar 20, the bolts being fitted in the head 21 while the slots 24 are provided in the said bar 20.

At opposite ends of the bar 20 are brackets 25 in which are pivoted curb sweepers 26 which are adapted for vertical swinging movement and when in working position are supported in substantially horizontal plane through chains 27 connected therewith and to a shield plate 28 which is fixed to and rises vertically from the frame 12 at the foremost portion thereof. The shield 28 is reinforced by a frame 29 and braces 30, respectively, these braces being fixed to the said frame 29 and also to the frame 12.

Supplemental to the brackets 25 are brackets 31 carrying rollers 32 for contact with the vertical wall of the curb 33 when the sweepers 26 are in working position for the sweeping of the top of the curb on the travel of the motor vehicle A. The sweepers 22 and 26 are of the bristle brush type.

When the attachment is in working position for the sweeping of the street or a surface 34 and the curb 33 the frame 12 is in lowered position with the sweepers 22 and 26 contacting with the surface 34 and the curb 33 and on advancement of the vehicle A such surface and curb will be swept or brushed. The roller 32 next to the curb 33 makes contact therewith so that this roller travels upon the vertical wall of the curb during the sweeping thereof. When the frame 12 is in lowered position the caster wheels 18 travel upon the surface 34, it being understood, of course, that the caster wheels 16 of the frame 11 have contact with the said surface 34 when the attachment is applied to the vehicle. On the raising of the frame 12 to the position shown by dotted lines in Figure 1 of the drawings the sweepers 22 and 26 are inactive, the working position of the sweepers being shown by full lines in said Figure 1.

What is claimed is:

1. An attachment of the kind described comprising front and rear pivotally connected frame sections for the swinging of the front section over the rear section, casters swiveled to said sections for movably supporting the same, means for separably attaching the rear section to a vehicle, a sweeper mounted for vertical adjustment on the front section and adapted for the sweeping of a ground surface when said front section is lowered from over the rear section, and curb sweeping brushes carried by the said front section and disposed beyond opposite ends of the first-mentioned sweeper.

2. An attachment of the kind described comprising front and rear pivotally connected frame sections for the swinging of the front section over the rear section, casters swiveled to said sections for movably supporting the same, means for separably attaching the rear section to a vehicle, a sweeper mounted for vertical adjustment on the front section and adapted for the sweeping of a ground surface when said front section is lowered from over the rear section, curb sweeping brushes carried by the said front section and disposed beyond opposite ends of the first-mentioned sweeper, and rollers carried by the front section and engageable with the curb.

3. An attachment of the kind described comprising front and rear pivotally connected frame sections for the swinging of the front section over the rear section, casters swiveled to said sections for movably supporting the same, means for separably attaching the rear section to a vehicle, a sweeper mounted for vertical adjustment on the front section and adapted for the sweeping of a ground surface when said front section is lowered from over the rear section, curb sweeping brushes carried by the said front section and disposed beyond opposite ends of the first-mentioned sweeper, rollers carried by the front section and engageable with the curb, and means for holding the curb sweeping brushes in sweeping position to the curb.

ANDREW JACKSON WESTMORELAND.